United States Patent [19]

Miyagawa et al.

[11] Patent Number: 4,989,081

[45] Date of Patent: Jan. 29, 1991

[54] HOME-BUS-INFORMATION SYSTEM

[75] Inventors: Masayuki Miyagawa, Chiba; Takao Itabashi; Hisafumi Yamada, both of Tokyo; Yoshio Osakabe, Kanagawa, all of Japan

[73] Assignee: Sony Corporation, Tokyo, Japan

[21] Appl. No.: 435,202

[22] Filed: Nov. 9, 1989

[30] Foreign Application Priority Data

Nov. 14, 1988 [JP] Japan ................................ 63-287195
Jun. 8, 1989 [JP] Japan .................................. 1-145657

[51] Int. Cl.⁵ .............................................. H04N 7/18
[52] U.S. Cl. ........................................ 358/93; 358/86; 358/183; 358/194.1
[58] Field of Search ................. 358/93, 86, 183, 194.1; 379/90, 96, 102, 103, 104

[56] References Cited

U.S. PATENT DOCUMENTS

| | | | |
|---|---|---|---|
| 3,482,037 | 12/1969 | Brown | 358/108 |
| 4,370,675 | 1/1983 | Cohn | 358/108 |
| 4,509,073 | 4/1985 | Baran | 358/86 |
| 4,649,428 | 3/1987 | Jones | 358/194.1 |
| 4,665,544 | 5/1987 | Honda | 379/102 |
| 4,777,526 | 10/1988 | Saitoh | 358/108 |
| 4,896,349 | 1/1990 | Kubo | 379/90 |

Primary Examiner—Howard W. Britton
Attorney, Agent, or Firm—Philip M. Shaw, Jr.

[57] ABSTRACT

A home-bus-information display system arranged such that the control status of each of a plurality of home apparatus can be monitored via home bus-lines and additively displayed over a video program on the picture screen of a television receiver to allow a viewer to monitor the control status of each of other home electric apparatus, a security system and so on in a centralized-control fashion.

18 Claims, 11 Drawing Sheets

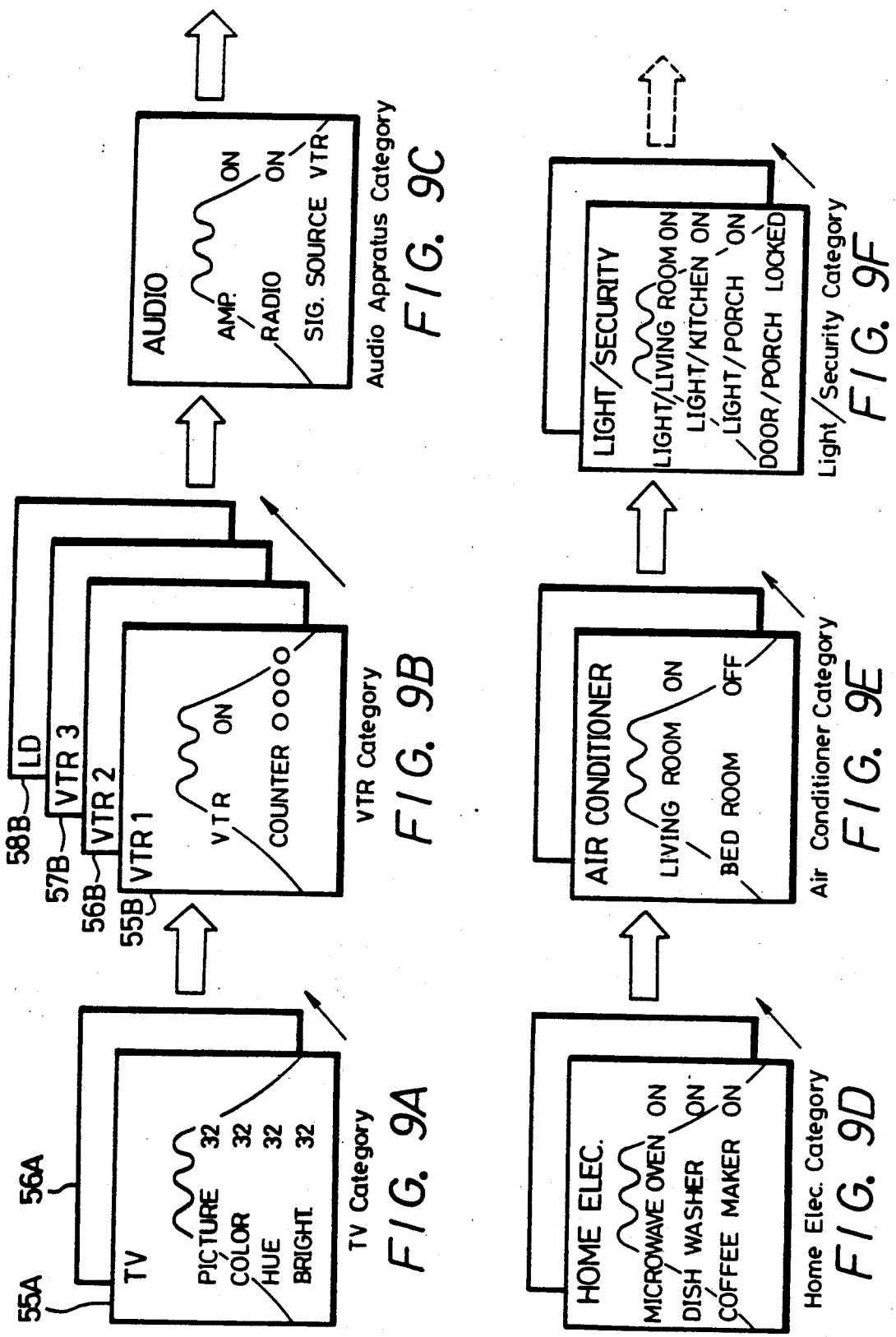

FIG. 12A
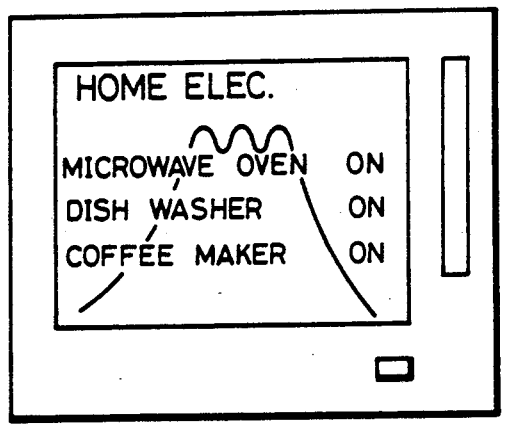
⇩
FIG. 12B
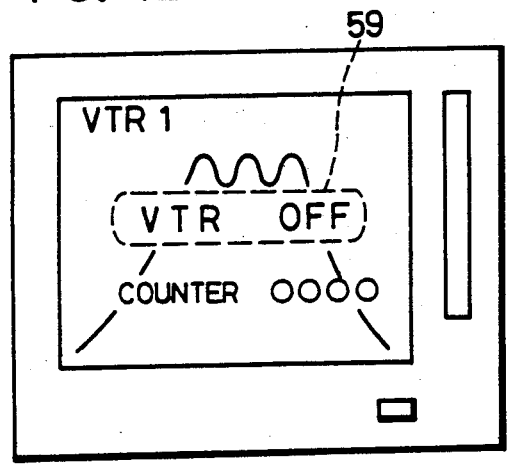
FIG. 14A
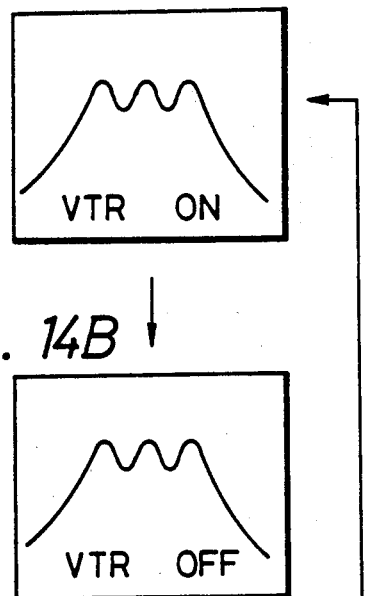
FIG. 14B
FIG. 14C
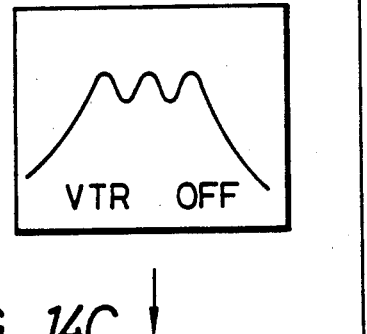
FIG. 14Z
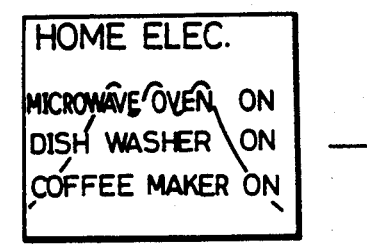

HOME-BUS-INFORMATION SYSTEM

BACKGROUND OF THE INVENTION

1. Field of the Invention

The present invention relates generally to home-bus-information display systems and, more particularly, is directed to a home-bus-information display system in which the control status of each of a plurality of home apparatus can be monitored by utilizing a coaxial cable connected to, for example, an antenna line such as a so-called home bus-line.

2. Description of the Prior Art

In homes and offices, various kinds of apparatus, such as home electric apparatus, lighting apparatus and security systems are independently installed in different places. In order to control the operations of these apparatuses, the user has to operate an optional remote commander or directly operate control switches provided on these apparatuses. Accordingly, when the user wants to confirm the control status of each of any particular apparatus, the user has to move to a position in which the user can visually confirm the status of the apparatus.

In order to overcome these disadvantages of the prior art, a system is proposed in which a central control panel is provided which is connected to each of the plurality of apparatuses and these apparatus are controlled by this central control panel, and the control status of each of these apparatuses is monitored. The provision of a central control panel makes the previously-proposed system complicated in arrangement and also degenerates a so-called space factor. Further, these apparatuses and the central control panel are connected to one another by a complicated wiring system.

OBJECTS AND SUMMARY OF THE INVENTION

Accordingly, it is an object of the present invention to provide an improved home-bus-information display system which can eliminate the above-noted defects encountered with the prior art.

More specifically, it is an object of the present invention to provide a home-bus-information display system in which the control status of each of a plurality of apparatuses can be monitored by a video monitor.

According to the home-bus-information display system of the first embodiment of the present invention, the control status of each of a plurality of apparatuses are selectively superimposed upon the video screen of a television receiver installed in the home or the office, such a screen is most suitable as a terminal apparatus of a so-called man-machine interface. Therefore, it is possible to remove an extra control apparatus such as a central control panel from such prior art systems.

According to the home-bus-information display system of the second embodiment of the present invention, the above-noted superimposed display of the control statuses is not performed at all times, so as to not disturb the conventional viewing condition of the television receiver.

According to the home-bus-information display system of the third embodiment of the present invention, the status display mode is provided so that, when the viewer wants, the viewer can visually confirm the control status of each of a plurality of apparatus at any time.

According to the home-bus-information display system of the fourth embodiment of the present invention, since a plurality of control status of each of a plurality of apparatuses are sequentially displayed on different display screens, it becomes possible for the viewer to visually confirm the control status of each of the apparatuses in sequence and with ease.

According to the home-bus-information display system of a fifth embodiment of the present invention, the viewer can readily confirm a change to status of each apparatus.

According to the home-bus-information display system of a sixth embodiment of the present invention, the displayed portion corresponding to an apparatus whose control status has changed is blinked or displayed in color different from those of other portions, whereby the viewer can readily identify the apparatus whose control status changed.

According to the home-bus-information display system of a seventh embodiment of the present invention, the viewer can distinguish the kinds of control status of each apparatus, one from another, with ease.

According to the home-bus-information display system of an eighth embodiment of the present invention, even when a plurality of apparatuses are not connected to a television receiver via bus lines, the television receiver can still display the control statuses of each of these apparatuses in a superimposed fashion as though they were connected to the television receiver. Therefore, the television receiver can perform the demonstration operation.

The above, and other objects, features and advantages of the present invention, will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIGS. 9A-9F and FIGS. 10A, 10B are pictorial representations used to explain the operation of the status display mode, respectively;

FIGS. 12A and 12B are schematic representations used to explain the status display operation of the television receiver, respectively;

FIGS. 14A-14C and 14Z are schematic representations used to explain the operation of the demonstration mode, respectively;

DETAILED DESCRIPTION OF PREFERRED EMBODIMENTS

A home-bus-information display system according to an embodiment of the present invention will hereinafter be described with reference to the drawings.

In this embodiment, the present invention is applied to a centralized-control system which controls household electric products and security apparatus in a home and to a centralized-control system which monitors the controlled condition (status) of these household electric products and security apparatuses.

Figure 1:
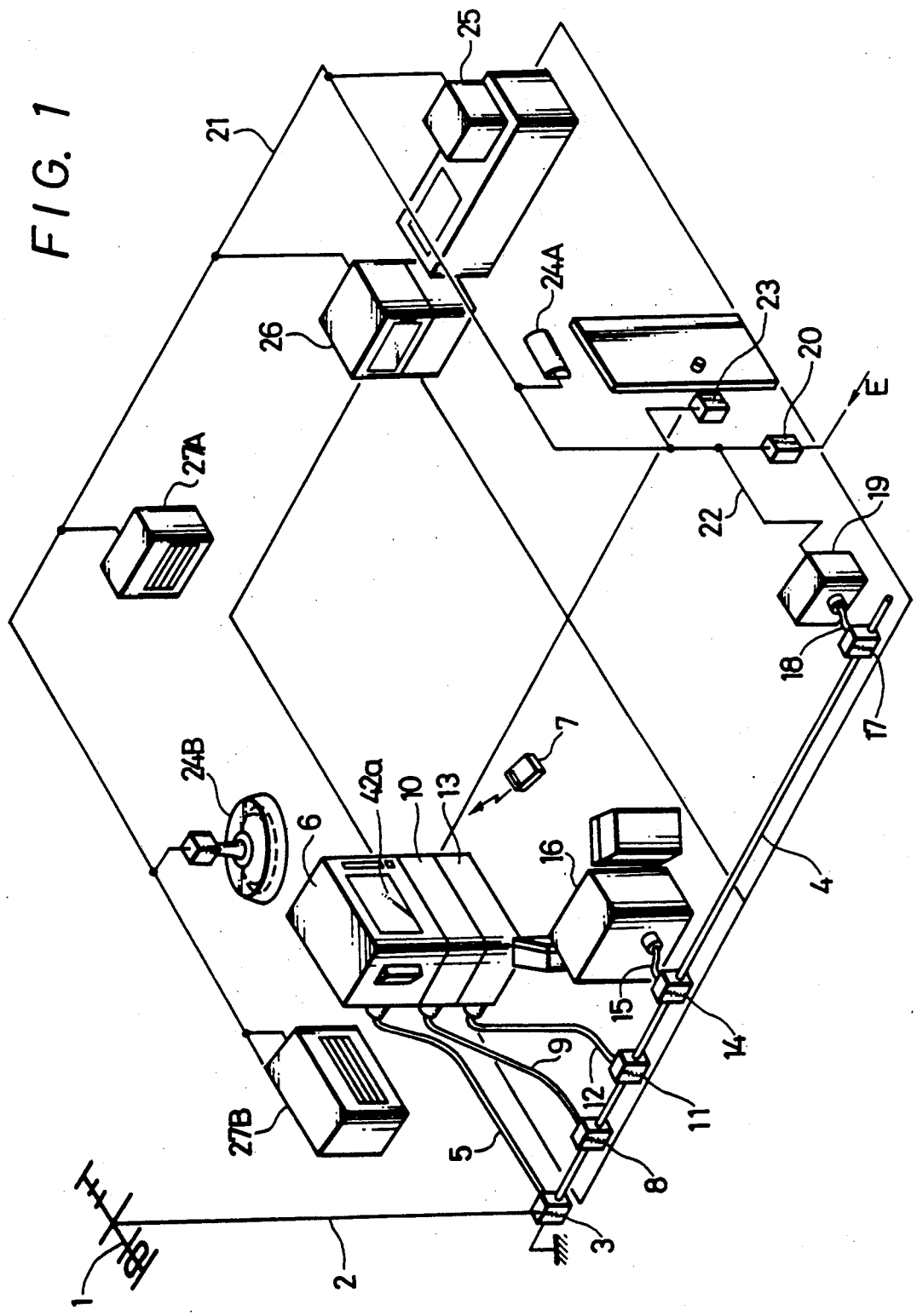
FIG. 1 is a diagrammatic, perspective view of a home-a-bus-information system, and which is of a type to which the present invention can be advantageously applied.

In FIG. 1, it will be seen that an antenna 1 for receiving a television broadcasting is connected through an antenna line 2 to a branching box 3. A coaxial cable 4 is connected through the branching box 3 to the antenna line 2. A branch coaxial cable 5 is connected at one end thereof to the coaxial cable 4 through the branching box 3. Another end of the branch coaxial cable 5 is connected to an input terminal of a television receiver 6. The coaxial cables 4 and 5 might be replaced with ordinary feeders such as so-called ribbon feeder. Upon use, the viewer remote-controls the television receiver 6 by use of a remote commander 7.

According to this embodiment, the viewer can control all apparatus such as household electric products, security apparatus and so on through the television receiver 6 by operating the remote commander 7 in a centralized fashion. Simultaneously, controlled conditions (status) of all apparatus can be displayed on a picture screen 42a of the television receiver 6 either in a superimposed condition or independently.

A video tape recorder (VTR) 10 is connected to the coaxial cable 4 through a branch coaxial cable 9 and a branching box 8; a so-called video disk player 13 is connected to the coaxial cable 4 through a branch box 11 and a branch coaxial cable 12; an audio apparatus 16 is connected to the coaxial cable 4 through a branch box 14 and a branch coaxial cable 15; and a signal interface circuit 19 is connected at one input/output terminal thereof to the coaxial cable 4 through a branch box 17 and a branch coaxial cable 18. A circuit breaker 20 is supplied at an input terminal thereof with an AC voltage of about 100 Volts and a frequency of 50 Hz to 690 Hz from a commercially available power source E from the outside. An output terminal of the circuit breaker 20 is connected to a home AC power supply line 21. This AC power supply line 21 is connected with another input/output terminal of the signal interface circuit 19 through a branch line 22. The signal interface circuit equipment 19 functions to superimpose a control signal flowing in the coaxial cable 4 upon a sine wave power supply source signal of 50 Hz or 60 Hz flowing through the AC power supply line 21 and to extract and transmit a control signal or a control status signal superimposed upon the sine wave power supply source line signal of 50 Hz or 60 Hz flowing through the AC power supply line 21 to the coaxial cable 4 side.

Considering the video tape recorder (VTR) 10 by way of example, "control signal" means a signal which is used to change the VTR 10 from an OFF-state to an ON-state, i.e. a command signal corresponding to "VTR ON", and "control status signal" means a signal output from the VTR 10 in response to an incoming command signal when the VTR 10 is placed, for example, in the ON-state, i.e. a signal corresponding to a message "VTR ON".

The AC power supply line 21 is connected in parallel with a door locking apparatus 23, an entrance lighting apparatus 24A, a living-room lighting apparatus 24B, a dish washer 25, a microwave oven 26, a bed-room air conditioner 27A and a living-room air conditioner 27B. Each of the apparatus, from door locking apparatus 23 to the living-room air conditioner 27B incorporates a bus interface circuit 48 (see FIG. 2) which extracts a distinctive control signal, superimposed upon the sine wave power supply source signal, from the AC power supply line 21, and which outputs a distinctive control status signal which is superimposed upon the sine wave power supply source signal. The apparatuses 23 to 27B are therefore connected to the television receiver 6 through the AC power supply line 21, the signal interface circuit 19 and the coaxial cable 4, respectively. Although the television receiver 6 and the video tape recorder 10 are also connected to the AC power supply line 21, their interconnections are not shown because they are not used to transmit control signals in this embodiment.

In this embodiment, so-called home-bus lines such as the coaxial cable 4 connected to the antenna line 2 and the AC power supply line 21 are used as bus lines, as described above. Thus, it is not necessary to perform new wiring. Further, a telephone line is an element indispensable in the home-bus-system and this telephone line can of course be employed as the bus line. In this case, the home-bus-information display system of this embodiment becomes more useful by the provision of a signal interface circuit which connects the coaxial cable 4 and the telephone line or the AC power supply line 21 and the telephone line.

Figure 2:
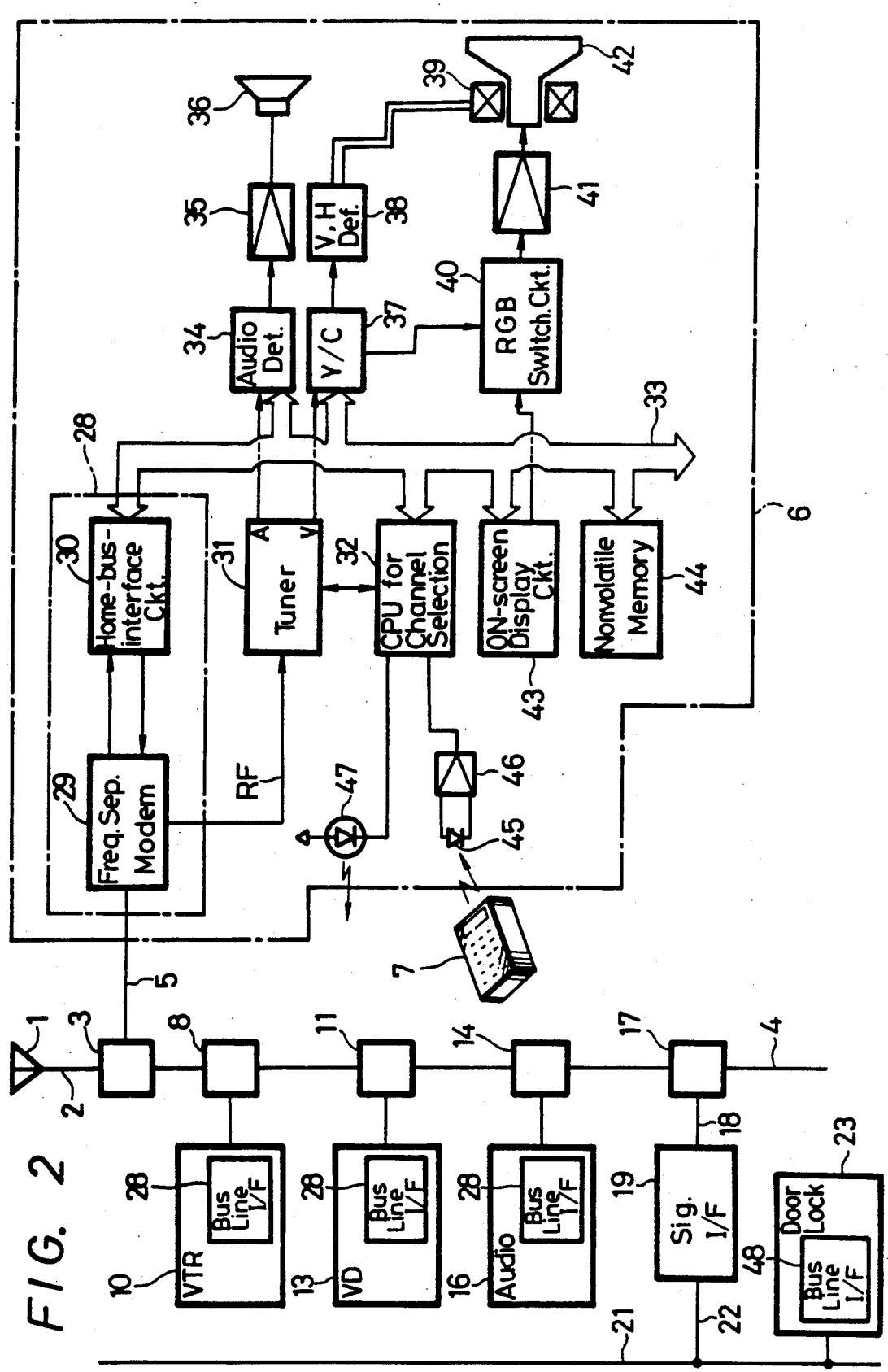
FIG. 2 is a block diagram of a television receiver according to an embodiment of the present invention, and which forms a main component of the home-bus-information display system of the present invention.

FIG. 2 schematically illustrates the arrangement of the television receiver 6 used in this embodiment.

Figure 3:
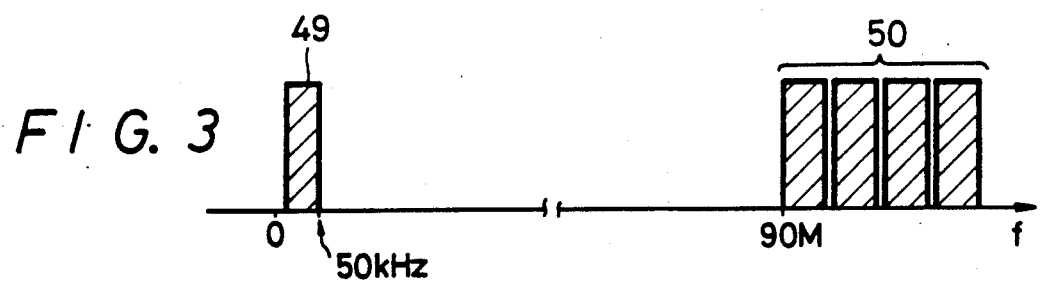
FIG. 3 is a diagram of a frequency band to which reference will be made in explaining the present invention.

In FIG. 2, there is provided a bus line interface circuit 28. The bus line interface circuit 28 is comprised of a frequency separation type modem circuit 29 whose input/output terminal is connected to the branch coaxial cable 5 and a home-bus-interface circuit 30. In this embodiment, as shown in FIG. 3, a frequency band 50 of higher than 90 MHz is used for receiving a television broadcasting signal and a frequency band 49 of about 0 to 50 kHz is used to transmit home-bus control signals accordingly. It is necessary to avoid the use of the power supply source frequencies of about 50 Hz or 60 Hz and frequencies near a harmonic wave of these frequencies. To this end, the frequency separation type modem circuit 29 is comprised of a high-pass filter which filters out and supplies a signal (RF signal) in the frequency band 50 to a tuner 31, a bandpass filter for filtering a signal of frequency band 49 out, a demodulating circuit which demodulates a signal in the frequency band 49 to provide a digital signal and a modulating circuit which modulates the digital signal to a signal in the frequency band 49, though not shown. The home-bus interface circuit 30 transmits the digital signal corresponding to the control signal to the frequency separation type modem circuit 29 and receives the same therefrom.

A microcomputer 32 is provided as a central control apparatus for controlling the television receiver 6, and might be a central processing unit (CPU). A bus-line 33 provided inside of the chassis of the television receiver 6 could be a two-line type bus line formed of, for example, a clock bus line and a data bus line. An audio signal from the tuner 31 is supplied through an audio signal detector circuit 34 and an audio amplifier circuit 35 to a speaker 36. A video signal from the tuner 31 is supplied through a Y/C (luminance/chrominance) processor circuit 37 including a color demodulator, a synchronizing separator and a luminance signal processor and a vertical and horizontal deflection circuit 38 to a deflection circuit 39 of a cathode ray tube (CRT) 42.

An RGB switch circuit 40 is supplied with three primary color signals from the Y/C processing circuit 37 and three primary color signals from an on-screen display circuit 43, and selectively supplies them to a video output circuit 41, thereby displaying pictures corresponding to these two sets of three primary color signals on the CRT 42 in a superimposed-fashion or independently.

A nonvolatile memory 44 is connected to the bus line 33. A photo diode 45 converts an infrared light beam, emitted from the remote commander 7, to an electrical signal. This electrical signal is amplified and transmitted to the CPU 32 for channel selection by an amplifying circuit 46. A light emitting diode (LED) 47 indicates the bus-line status, and lights up in a period of time where control signals are transmitted through the bus lines 4 and 21.

Figure 4:
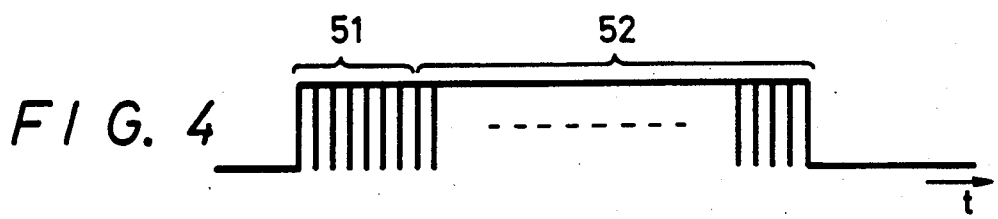
FIG. 4 is a diagram of a remote control signal used in the present invention.

In this embodiment, the remote commander 7 is provided with keys to control all of the apparatus such as the television receiver 6, the video tape recorder 10, the video disc player 13 and the like. A remote control signal of the remote commander 7 is formed of one byte of apparatus address code 51 and 4 bytes of a function code 52 as shown in FIG. 4.

When the apparatus address code 51 of the remote control signal inputted by the remote commander 7 is not a category "television", the CPU 32 for channel selection transmits, the apparatus address code 51 and the function code 52 through the bus-line interface circuit 28 to the branch coaxial cable 5 side. Further, when supplied with the apparatus address code 51 and the function code 52 from the bus line interface circuit 28, the CPU 32 for channel selection decodes these codes 51 and 52 to perform the corresponding operations.

As shown in FIG. 2, the video tape recorder 10 and the video disc player 13 are each provided with the bus-line interface circuit 28 similarly to the television receiver 6. The door locking apparatus 23 connected to the AC power supply source line 21 is provided with a bus-line interface circuit 48 whose arrangement is substantially the same as that of the above-noted bus-line interface circuit 28. Therefore, the video tape recorder 10 and the door locking apparatus 23 can be controlled via the television receiver 6.

The fundamental functions of the television receiver 6 will now be described in detail.

(A) Operation when the status changes:

This operation means that control signals, emitted from the remote commander 7, are supplied through the television receiver 6 to the bus lines 4 and 21 while nearly simultaneously another control signal or a control status signal is supplied back through the bus lines 21 and 4 to the television receiver 6 (from an apparatus other than the television receiver 6. To be more concrete, when the video tape recorder 10 is turned ON by the remote commander 7 through the teleVision receiver 6 and the bus line 4, the video tape recorder 10, in reply, supplies the television receiver 6 with a command code indicating that a receiving channel should be changed to a vacant channel such as CH. 2 in Tokyo. In that event, the television receiver 6 changes the receiving channel to the vacant channel such as CH.2 in Tokyo and displays, for example, CH.2 on the screen thereof in response to such command code.

(B) Operations when the control status of each of each apparatus changes:

More specifically, when the video tape recorder 10 is turned ON and/or OFF, inadvertently by a baby for example, or when the door of the entrance is opened and closed or closed and opened or when the door light 24A is turned ON and/or OFF, the apparatus whose control status changes supplies its own address code and a function code corresponding to the changed control status to the bus lines 21 and 4, whereby the television receiver 6 can recognize the change of control status from the bus line interface circuit 28. Accordingly, the television receiver 6 performs an on-screen display (for example, "VTR ON") corresponding to the change of control status, if necessary.

(C) Operation in the status display mode:

When the user wants to know the present status of respective apparatus, the user supplies the television receiver 6 with a status display command by manipulation of the remote commander 7. In response thereto, the television receiver 6 asks the present control status of each of all apparatus through the bus lines 4 and 21. In making an answer, data indicating the present control status of each of each apparatus is supplied through the bus lines 4 and 21 to the television receiver 6, and the television receiver 6 thereafter displays these data on its screen. In this case, cross modulation interference will not occur because the bus line interface circuits 28 and 48 are arranged such that when one of the bus line interface circuits 28 and 48 supplies a signal, another one is inhibited from outputting a signal.

(D) Operation in the control mode

As mentioned above, the viewer can control the status of apparatus via the television receiver 6 and the bus lines 4 and 21 by manipulation of the remote commander 7. Let us consider the following concrete cases in which the video tape recorder 10 is turned ON or the light 24A is turned OFF by manipulation of the remote commander 7. If the viewer depresses the VTR-ON button of the remote commander 7 in order to switch ON the video tape recorder 10, the television receiver 6 supplies the bus line 4 with a control signal corresponding to the "VTR ON" and also displays "VTR ON" on the video screen 42a in a superimposed fashion. Alternatively, the television receiver 6 is capable of performing a so-called hand-shake operation in which "VTR ON" is displayed on the video screen 42a in a superimposed fashion when the control status signal corresponding to the "VTR ON" is returned thereto from the video tape recorder 10. In a like a manner, if the viewer depresses a LIGHT-OFF" button of the remote commander 7 in order to turn the light 24A OFF, the light 24A is turned OFF and, for example, "LIGHT OFF" is displayed on the video screen 42a in a superimposed fashion.

Let us now explain the operation of the present invention, laying great emphasis on the operation of the television receiver 6 of this embodiment when the control status of each of the respective apparatus is monitored by the television receiver 6.

The operation of the television receiver 6 when the control status of each of the video tape recorder 10 changes will be described in detail with reference to FIGS. 5 to 7. In this case, the television receiver 6 is supplied with a remote control signal from the remote commander 7 or the television receiver 6 is supplied with signals indicative of the control status of each of each apparatus from the bus lines 4 and 21. In this embodiment, let us assume that the remote commander 7 emits the remote control signal to turn ON the video tape recorder 10.

Figure 5:
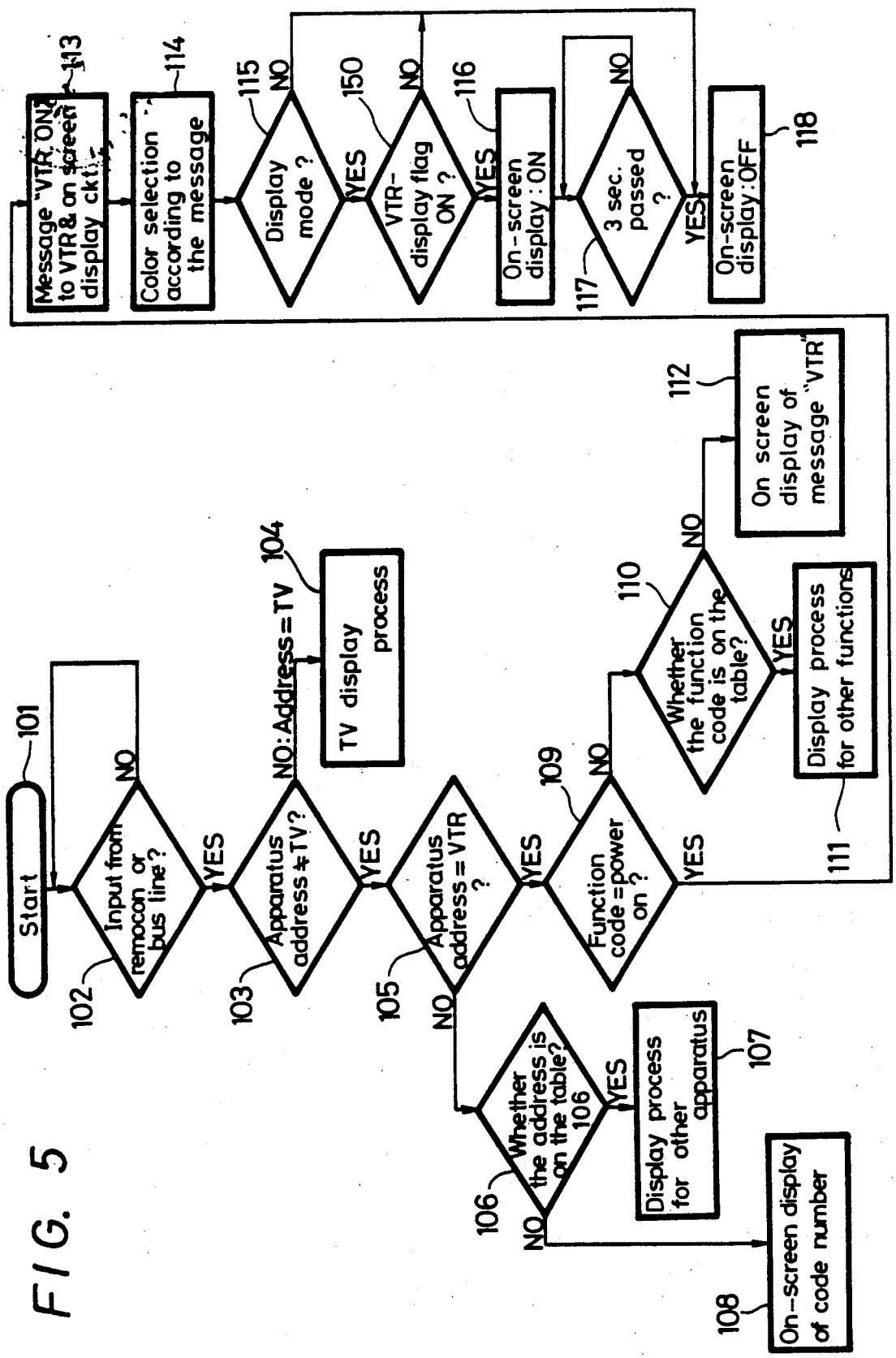
FIG. 5 is a flow chart to which reference will be made in explaining the operation when the status changes.

FIG. 5 is a flow chart followed by the programming of the microcomputer 32 to which reference will be made in explaining the operation of the television receiver 6.

Referring to FIG. 5, following the Start of operation in step 101, it is determined in the next decision step 102 by the CPU 32 in the television receiver 6 whether the television receiver 6 is receiving either the remote control signal or the bus line input. If it is determined that the television receiver 6 is supplied with one of the remote control signal or the bus line input, as represented by a YES at step 102, the routine proceeds to the next decision step 103. In step 103, it is determined by the CPU 32 whether the apparatus address code of the most significant one byte of the input signal indicates the category "television" or not. If it is determined that the apparatus address code is equal to the category "television", then the routine proceeds to step 104. In step 104, a process corresponding to the function code of the less significant 4 bytes is executed. If on the other hand it is determined that the apparatus address code is not equal to the category "television", the routine proceeds to the next decision step 105. In step 105, it is determined by the CPU 32 whether or not the apparatus address code is equal to a category "VTR".

If it is determined that the apparatus address code is not equal to the category "VTR"as represented by a NO at step 105, then the routine proceeds to the next decision step 106. In step 106, it is determined by the CPU 32 whether or not the apparatus address code is stored in the apparatus address code table in the ROM (not shown) incorporated within the CPU 32. If it is determined that the apparatus address code is stored in the table as represented by a YES at step 106, then the routine proceeds to step 107 in which a display process for such other apparatus is executed. If on the other hand it is determined that the apparatus address code is not in the table as represented by a NO at step 106, then the routine proceeds to step 108. In step 108, an input control signal of 5 bytes (apparatus address code of one byte and function code of 4 bytes) is converted to a code number of hexadecimal notation and 10 digits by the CPU 32, and the code number of hexadecimal notation is superimposed upon the video screen 42a of the picture tube 42 (CRT) by the on-screen display circuit 43 as shown in FIG. 7B.

Figure 7A:
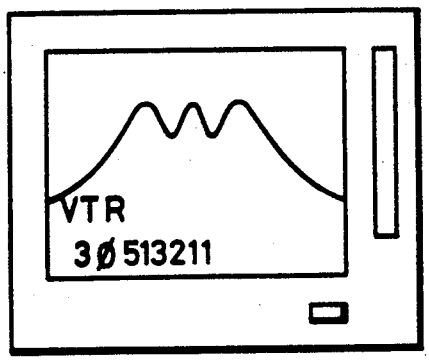
Figure 7B:
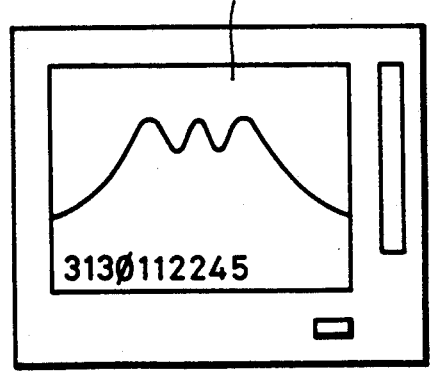

The display shown in FIG. 7B occurs when a noise component enters the bus line or when the viewer mis-operates the remote commander 7. Therefore, the viewer can know the existence of the noise component and the occurrence of the mis-operation for such a display. Also, the serviceman can decode the displayed code and utilize the same for maintenance service. Further, instead of the display superimposed as shown in FIG. 7B, a message such as "NO FUNCTION CODE AVAILABLE" can be superimposed upon the video screen 42a.

If it is determined that the apparatus address code is equal to the category "VTR" as represented by a YES at step 105, then the routine proceeds to the next decision step 109. It is determined in step 109 by the CPU 32 whether or not the remaining function code of 4 bytes corresponds to "POWER ON". If it is determined that the function code is not corresponding to "POWER ON" as represented by a NO at step 109, then the routine proceeds to the next decision step 110. In step 110, it is determined by the CPU 32 whether or not the function code is in the table of the ROM of the CPU 32. If it is determined that the function code is in the table as represented by a YES at step 110, the routine proceeds to step 111, wherein the display process for other function codes is performed. If on the other hand it is determined that the function code is not in the table as represented by a NO at step 110, then the routine proceeds to step 112, whereat the message "VTR" and the function code thereof are converted to a number of 8 digits in a hexadecimal notation and this number is displayed on the screen as shown in FIG. 7A.

If it is determined that the function code corresponds to "POWER ON" as represented by a YES at step 109, then the routine proceeds to step 113. In step 113, the apparatus address code and the function code are transferred tot he video tape recorder 10 via the bus line 5, and the message "VTR ON" is inputted to the on-screen display circuit 43. Thereafter, the color to be displayed is selected in accordance with the content of the message and the selected display color is instructed to the on-screen display circuit 43 at step 114. The display color is selected as follows: When, for example, the dish washer 25 is driven, when the power source of the VTR 10 is in its ON-state and when the door locking apparatus 23 is in its opened state, the message is displayed in red, while when the dish washer 25 is made inoperable, when the power source of the VTR 10 is in its OFF-state and when the door locking apparatus 23 is in its closed state, the message is displayed in green.

Therefore, according to this embodiment, the safety state is displayed in green and the potentially dangerous state is displayed in red, thus enabling the viewer to readily distinguish the safety state from the potentially dangerous state.

Then, the routine proceeds to the decision step 115, whereat it is determined by the CPU 32 whether or not the present mode is the display mode. More specifically, the display mode can be identified by either checking the status of selection switches provided on the rear surface of the television receiver 6 or by reading a flag previously stored in the nonvolatile memory 44 by manipulation of the remote commander 7. If it is determined that the present mode is not the display mode as represented by a NO at step 115, the routine proceeds to step 118, whereat the on-screen display is turned OFF. This provides the advantage that the viewer can stop the on-screen display at any time when the on-screen display seems to be troublesome.

If on the other hand it is determined that the present mode is the display mode as represented by a YES at step 115, then the routine proceeds to the next decision step 150. In step 150, it is determined by the CPU 32 whether a VTR-display flag is ON or not. If it is determined that the VTR-flag is OFF (low level "0") as represented by a NO at step 150, the routine proceeds to step 118, in which the on-screen display is turned OFF. The step 150 is provided in order to respectively check the existence of or non-existence of the display.

Figure 6A:
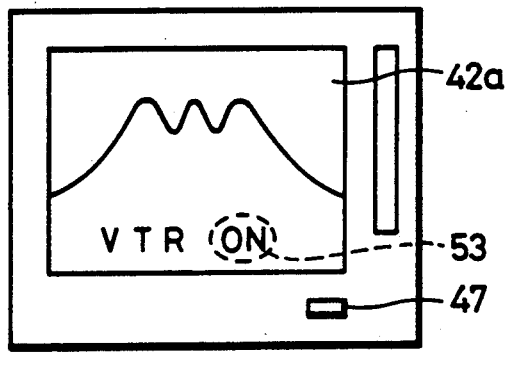
FIGS. 6A, 6B and FIGS. 7A, 7B are pictorial representations used to explain the operation when the status changes, respectively.

If it is determined that the VTR-display flag is ON as represented by a YES at step 150, then the routine proceeds to step 116. In step 116, the CPU 32 operates the on-screen display circuit 43 and the RGB switch circuit 40 so that the on-screen display is turned ON as shown in FIG. 6A. Then, the routine proceeds to step 117, whereat it is determined whether or not 3 seconds are passed after the on-screen display is turned ON. If so, the routine proceeds to step 118, in which the on-screen display is turned OFF.

According to this embodiment, the message indicating the control status of each of the apparatus such as the VTR 10 is superimposed upon the video screen 42a of the television receiver 6 so that, when the viewer watches a television broadcasting program, the viewer can confirm the control status of each of these apparatuses with ease.

Further, according to this embodiment, the television receiver 6, which is generally installed in the home or office and which is suitable as a so-called man-machine interface terminal having the remote commander 7 and the cathode ray tube 42, is employed to monitor the control status of each of the respective apparatus and the bus lines 4 and 21. It is not necessary to separately provide a central control panel. Thus, the system of the present invention is advantageous from a space factor and money standpoint.

According to this embodiment, the step 117 of FIG. 5 is provided to limit the time of on-screen display within the predetermined time period, thereby protecting the viewer from trouble in viewing the television broadcasting program. Also, this can protect channel information and the like from being disturbed when they are superimposed upon the video screen 42a of the cathode ray tube 42. Further, the viewer is relieved of a troublesome operation for frequently turning ON and-/or OFF the display mode.

Further, the LED (light emitting diode) 47 is provided to indicate the bus line status as shown in FIG. 6A so that the television receiver 6 causes the LED 47 to blink when the control information is supplied to the bus line 4. Therefore, the user can visually confirm the supply of the information through the bus lines 4 and 21.

Figure 6B:
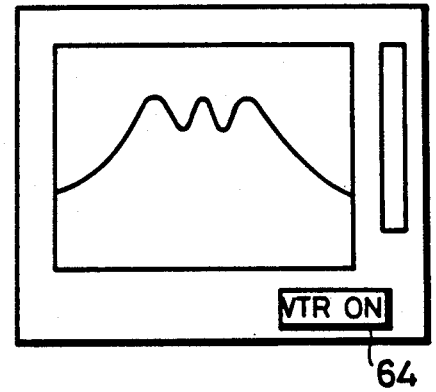

While the control status message is superimposed upon the video screen 42a as shown in FIG. 6A according tot his embodiment, in other embodiments it could also be, as shown in FIG. 6B, an LED dot matrix display plate 64 attached to the television receiver 6 so as to display the television channel, whereby the message such as "VTR ON" is displayed on this LED display plate 64.

Figure 8:
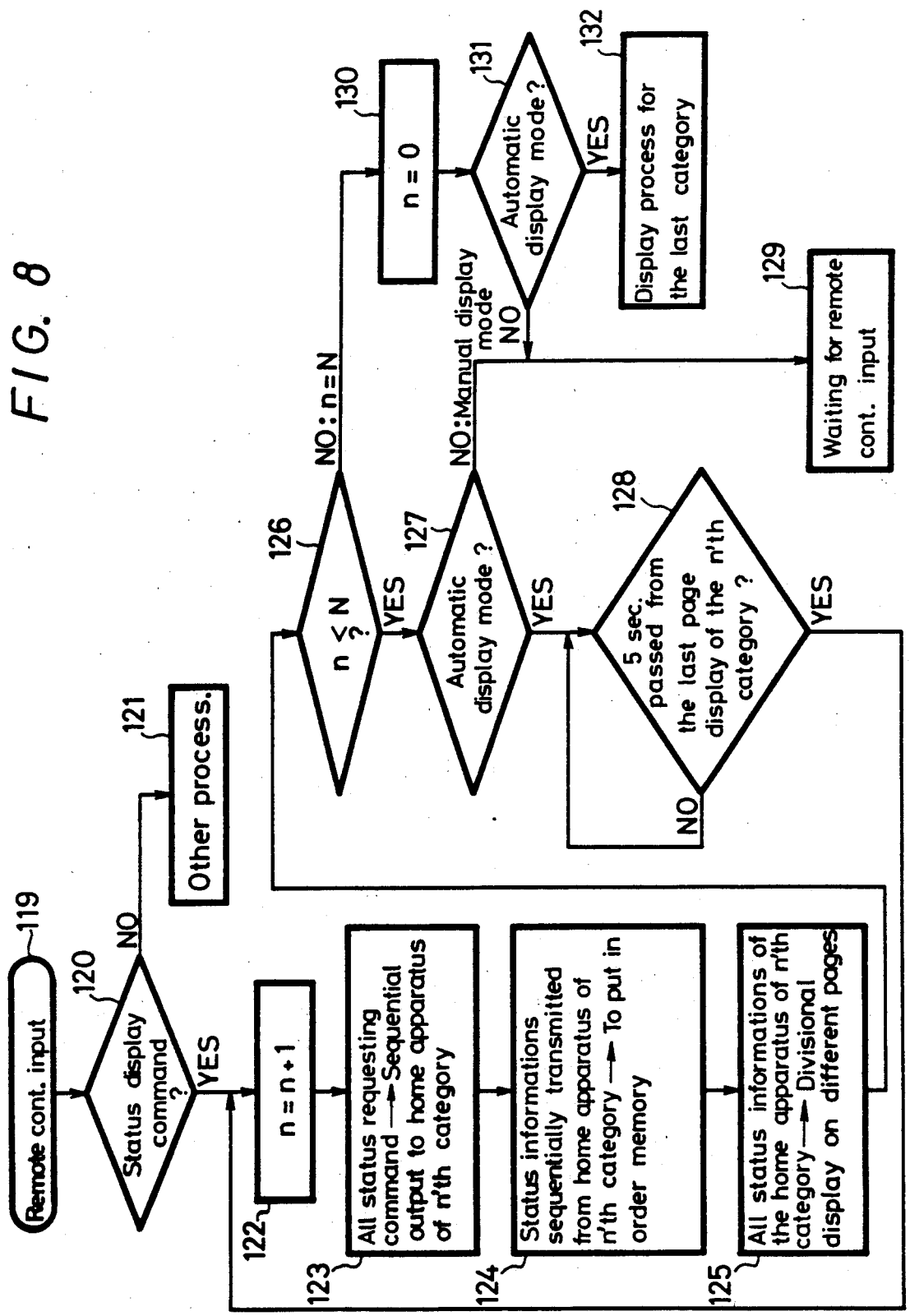
FIG. 8 is a flow chart to which reference will be made in explaining the operation of the status display mode.

With reference to FIGS. 8 to 10, let us explain next an operation whereby a message indicating the control status of each of each apparatus is sequentially displayed on the cathode ray tube 42 of the television receiver 6 by manipulation of a status display key of the remote commander 7. In this case, by manipulation of the operation keys of the remote commander 7, "manual display mode" and "automatic display mode" can be further selected. In the "manual display mode", the status information of apparatus in a certain category can be superimposed by one manipulation of an operation key, while in the "automatic display mode", the status information of apparatus of all categories can be automatically and sequentially displayed by one manipulation of operation key.

FIG. 8 is a flow chart followed by the programming of the CPU 32 to which reference will be made in explaining the above-noted operation. When the television receiver 6 is supplied with the remote control signal from the remote commander 7 (in step 119) it is determined in the next decision step 120 by the CPU 32 whether or not the input command is the status display command. If it is determined that the input command is not the status display command as represented by a NO at step 120, then the routine proceeds to step 121, whereat the process for the input command is performed.

If, on the other hand, it is determined that the input command is the status display command as represented by a YES at step 120, the routine proceeds to steps 122 to 125. In step 122, the CPU 32 increments a variable n in the RAM (random access memory) incorporated in the CPU 32 by 1. This variable n is generally reset to zero when the power switch of the television receiver 6 is turned ON. In the next step 123, all status requesting commands are sequentially outputted from the television receiver 6 to the home apparatus of the n'th category through the bus lines 4 and 21, and then the home apparatus of the n'th category sequentially returns status information signals to the television receiver 6. In step 124, the CPU 32 puts in order the status information sequentially transmitted from the home apparatus of the n'th category and stores the same in the RAM. The amount of the status information returned which can be displayed on one picture screen will hereinafter be referred to as a page. In the next step 125, the CPU 32 operates so that all status information of the home apparatus of the n'th category are displayed in a superimposed manner of a divisional display on different pages 55A and 56A as shown in FIG. 9A.

It is determined in the next decision step 126 by the CPU 32 whether or not the variable n is smaller than the maximum value N. If it is determined that the variable n is smaller than the maximum value N as represented by a YES at step 126, the routine proceeds to step 127. In step 127, it is determined whether or not the present display mode is the "automatic display mode". If it is determined that the present display mode is the "automatic display mode" as represented by a YES at step 127, the routine proceeds to step 128. It is determined in step 128 by the CPU 32 whether or not 5 seconds have passed since the last page of the n'th category was displayed. If so, the routine returns to step 122, wherein the status of the apparatus of the (n+1)'th category are displayed on pages 55B to 58B, separately, as shown in FIG. 9B.

If on the other hand it is determined in step 127 that the present display mode is not the "automatic display mode", i.e. if it is the "manual display mode", then the routine proceeds to step 129. In step 129, the CPU 32 is set in a standby mode for awaiting the remote control input. In this state, if the viewer emits the status display command by manipulation of the remote commander 7 while the television receiver 6 is in the manual display mode, status information of the apparatus of the (n+1)'th category will be displayed on the television receiver 6.

If it is determined in step 126 that the variable n becomes equal to the maximum value N, the routine proceeds to step 130. In step 130, the CPU 32 resets the variable n to zero. The routine proceeds to the next decision step 131, whereat it is determined by the CPU 32 whether or not the present display mode is the "automatic display mode". If it is determined that the present display mode is the "automatic display mode", then the routine proceeds to step 132, wherein the last category is displayed. More specifically, the last category is displayed for 5 seconds, and the superimposed display of status information is turned OFF. Alternatively, the displayed state of the last category can be maintained. If it is determined that the present display mode is the "manual display mode" as represented by a NO at step 131, then the processing by the CPU 32 goes to step 129 where the CPU 32 awaits a remote control input.

According to this embodiment, the viewer can visually confirm the control status of each of the apparatus connected to the bus lines 4 and 21 at any time. Further, if the viewer operates only the status display key on the remote commander 7, the status information of the respective apparatus will sequentially be displayed on the video screen 42a of the television receiver 6 in the manner of a divisional display of different categories and pages as shown in FIGS. 9A to 9F. This displayed condition is easy to see for the viewer.

While in this embodiment the status information of the apparatus of the respective categories are displayed as shown in FIGS. 9A-9F, inclusive, it is also possible that fundamental status information such as ON/OFF of the apparatus can be displayed on different pages.

Furthermore, the remote commander 7 is provided with status display keys of different categories. In that event, there is the advantage that the status information of the particular category which the viewer wants to display can be readily superimposed upon the video screen 42a of the television receiver 6.

Figure 11:
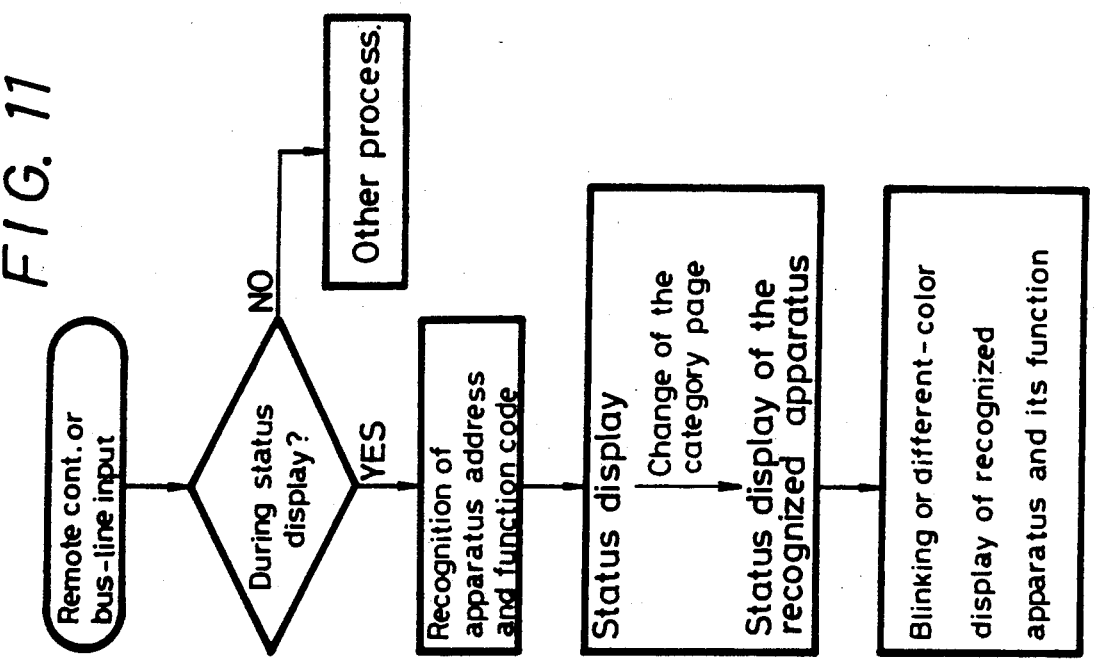
FIG. 11 is a flow chart to which reference will be made in explaining the status display operation of the television receiver.

With reference to FIGS. 11 and 12, let us now explain the operation of the CPU 32 of the television receiver 6 when the status information is being displayed and the television receiver 6 is also supplied with the remote control input or the bus line input.

Figure 10A:
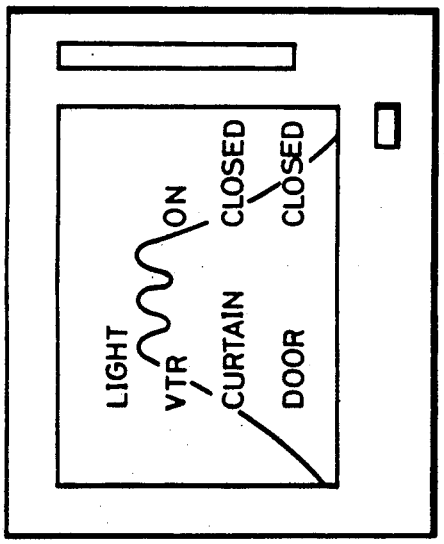
Figure 10B:
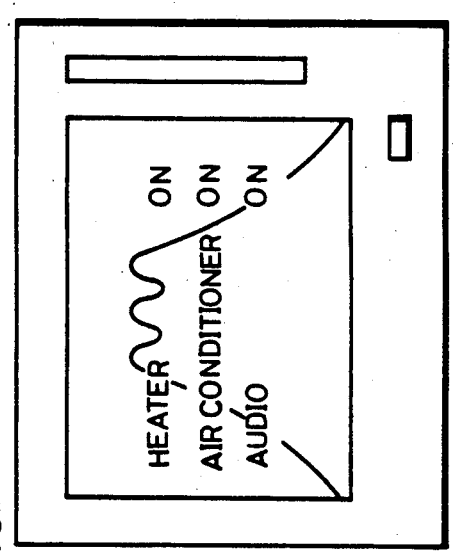

Referring to FIG. 11, when the television receiver 6 is supplied with the remote control input or the bus line input at step 133, then the processing by the CPU 32 proceeds to the next decision step 134. Although in step 134 it is determined whether the status information is displayed or not, initially we have assumed that at present the status information is displayed. Thus, the routine proceeds to step 136. Then, the CPU 32 identifies the apparatus address code of one byte and the function code of 4 bytes and changes the category and the page corresponding to the identified apparatus and function so that the example shown in FIG. 10A is changed to the example of FIG. 10B (see step 137). In the next step 138, the displayed portion (encircled by, for example, a broken line 59 in FIG. 12B) of the displayed portion of the identified apparatus and the function code is made to blink or the color of that displayed portion is made different from those of other portions. For example, the color of the superimposed portion of FIG. 12A is green, and the color of the encircled portion by the dashed line 59 of FIG. 12B is made yellow.

According to the operation shown in FIG. 11, the viewer can visually confirm the occurrence of the bus line input or the change of control status of each of the respective apparatus with ease positively during the display of the status information.

Referring again to FIG. 11, when the television receiver 6 is supplied with the remote control input or the bus line input during the display of status control information, the speaker 36 of the television receiver 6 can emanate an alarm sound to give the viewer warning.

Figure 13:
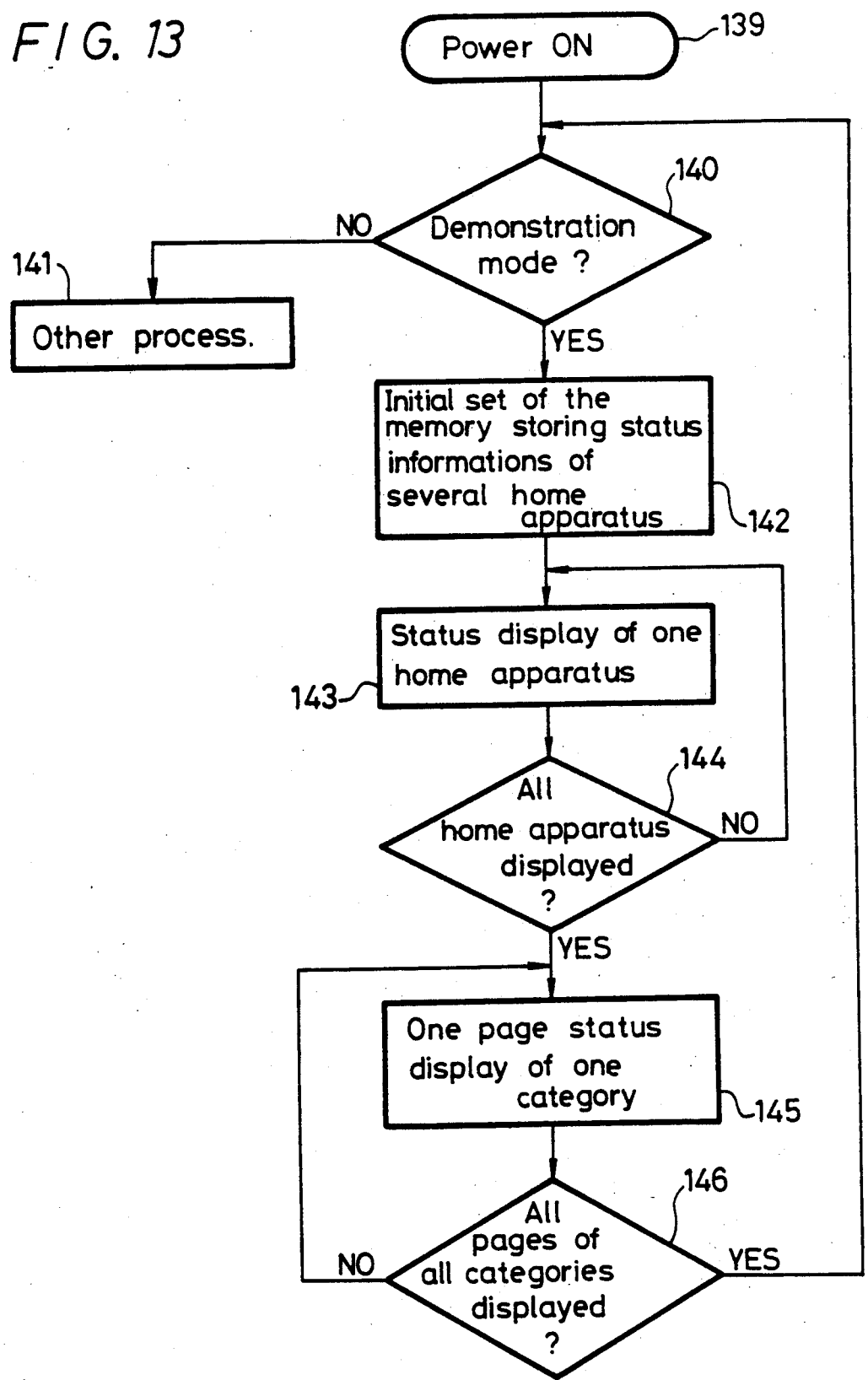
FIG. 13 is a flow chart to which reference will be made in explaining the operation of the television receiver in a demonstration mode.

With reference to FIGS. 13 and 14, let us explain the operation when a simulation of the operation of the home-bus system information is demonstrated by the use of the television receiver 6 according to this embodiment. In that event, the television receiver 6 receives only the television broadcasting signal and other apparatus such as the video tape recorder 10 and the video disc player 13 can not be connected to the bus lines 4 and 21.

In order to set the television receiver 6 in the demonstration mode, a power key must be depressed while a sound volume adjustment key, for example, provided at the television receiver body of the television receiver 6 is being depressed when the television receiver 6 is powered. In that event, the processing by the CPU 32 proceeds to step 139, step 140 and step 142, arranged in that order, thereby performing the demonstration operation. The CPU 32 for channel selection performs the initial set of the contents of the memory area of the incorporated RAM in which the status information of the home apparatuses are stored in accordance with the program of the incorporated ROM, and sequentially superimposes the status information of the home apparatuses upon the picture as, for example, shown in FIGS. 14A to 14C (see steps 143 and step 144). Then, the status information of all categories are respectively displayed on different pages (steps 145 and 146) as shown in FIG. 14Z. Thereafter, the processing by the CPU 32 returns to step 140, whereat the demonstration will be performed if the sound volume adjustment key is still depressed.

According to the example shown in FIG. 13, the television receiver 6 is operated as though a plurality of home apparatus were connected to the bus lines 4 and 21. Therefore, the present invention is very useful for demonstrating a simulation of the so-called home-bus line information display system to prospective purchasers of the system at the retail store.

Figure 15A:
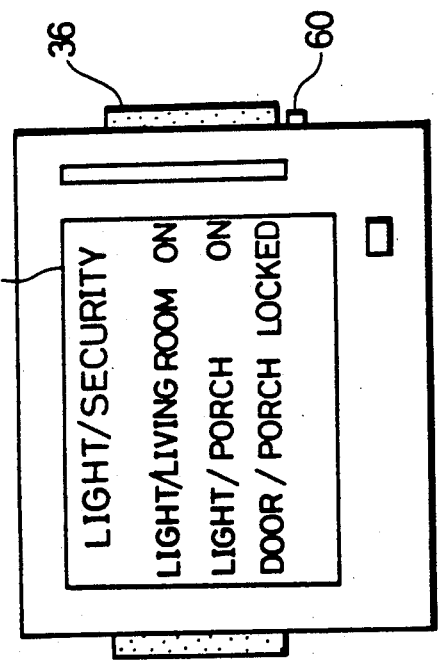
FIGS. 15A and 15B are schematic representations of the picture screen of a video monitor, and to which reference will be made in explaining the operation of the home-bus mode, respectively.

Further, the television receiver 6 of this example is provided with a home bus mode switch 60 as shown in FIG. 15A. If the television receiver 6 is set in the home bus mode by manipulation of the home bus mode switch 60, then only the status information of the home apparatuses connected to the bus lines 4 and 21 are individually displayed on the cathode ray tube 42 of this television receiver 6 as shown in FIG. 15A. In other words, white status information, for example, are displayed in a blue background (blue-back) 61. If light/porch 24A is turned OFF, then the display of 37 "LIGHT/PORCH OFF" (encircled by a broken line 63 in FIG. 15B) is blinked or displayed in a different color. At the same time, the speaker 36 of the television receiver 6 emanates an alarm sound.

Figure 15B:
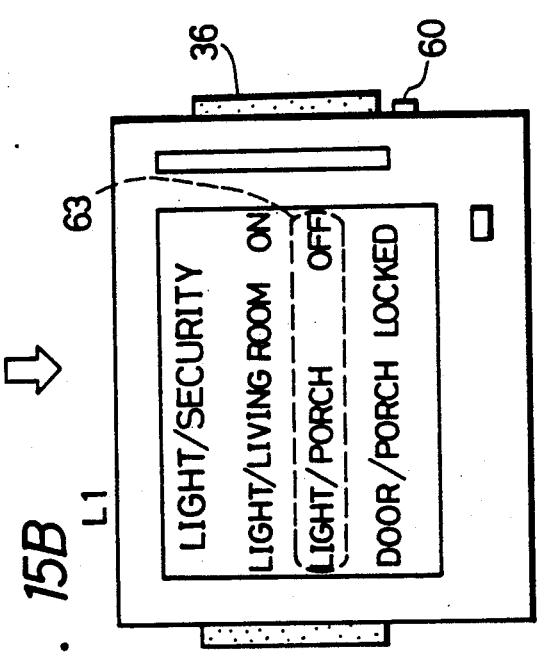

According to the embodiment shown in FIGS. 15A and 15B, the television receiver 6 can be exclusively employed as a monitor for a plurality of home apparatuses connected to the bus lines 4 and 21.

Figure 17:
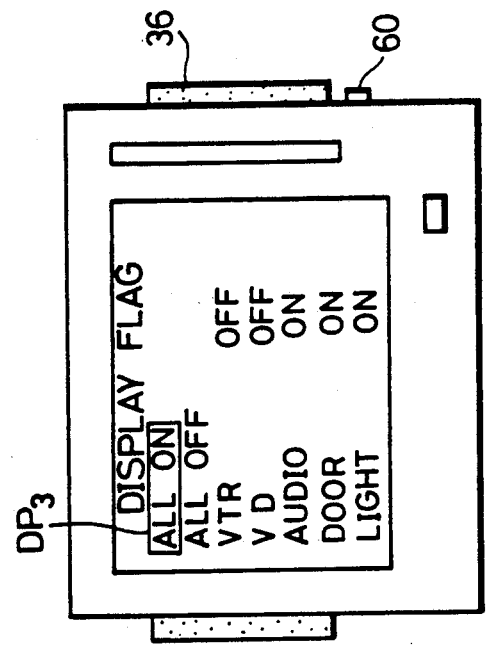
FIG. 17 is a schematic representation of a picture screen of a video monitor, and to which reference will be made in explaining the operation of the display flag set-up mode.
Figure 16:
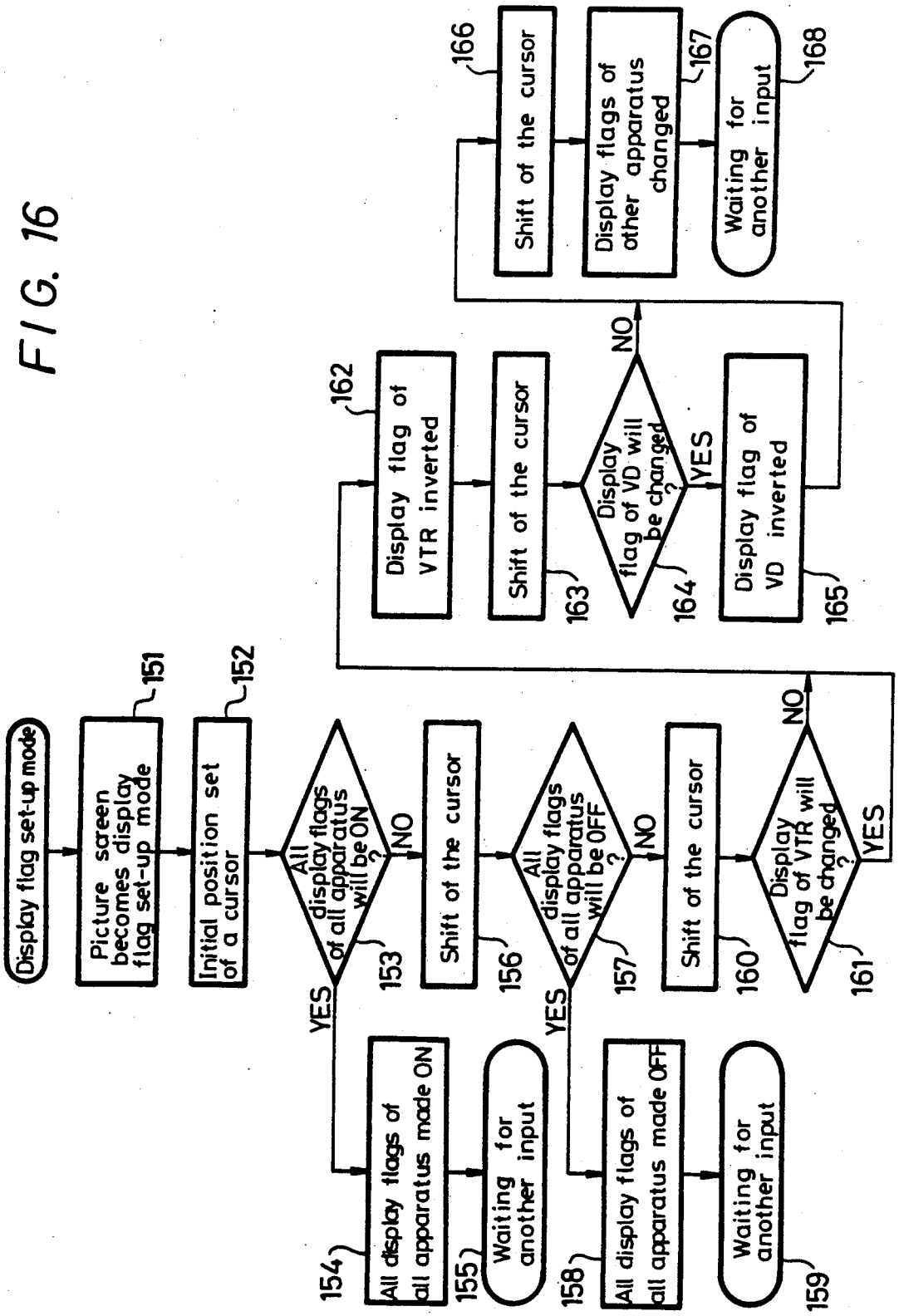
FIG. 16 is a flow chart to which reference will be made in explaining the operation of the display flag set-up mode.

In this embodiment, the viewer can choose whether or not the control status information of one home apparatus is displayed by separately changing the status of the display flag of each home apparatus. With reference to FIGS. 16 and 17, let us now explain the operation of this mode. In that event, the viewer sets the CPU 32 of the television receiver 6 in the display flag set-up mode by operating a switch of the television receiver body or a predetermined key of the remote commander 7.

The CPU 32 for channel selection sets the display screen of the television receiver 6 in the display flag set-up mode as shown in FIG. 17 in step 151 of a flow chart forming FIG. 16. Then, a cursor DP₃ in the displayed picture shown in FIG. 17 is moved to the uppermost position of [ALL ON] for the initial setting (in step 152). [ALL ON] means that display flags of all home apparatus are all set to ON (i.e. high level "1"). If the viewer wants this all set-up and operates, for example, a [set-up] key of the remote commander 7, the processing by the CPU 32 proceeds from step 153 to step 154, whereat all display flags of all home apparatus are made ON. Then, the CPU 32 for channel selection is set in its standby mode for awaiting another input from the remote commander 7 in step 155.

If in step 153 the viewer operates, for example, a [PASS] key of the remote commander 7, then the processing by the CPU 32 proceeds from step 153 to step 156, whereat the cursor DP₃ of FIG. 17 is shifted to the next line and is placed at the position of [ALL OFF]. In that even, if the viewer operates the [SET-UP] key of the remote commander 7, the display flags of all home apparatus are all made OFF (steps 157 to 159). If the viewer operates the [PASS] key of the remote commander 7, then the cursor DP₃ of FIG. 17 is further shifted to the next line and is placed at the position of [VTR] (steps 157 and 160). If in the next step 161 the viewer operates the [SET-UP] key of the remote commander 7, the display flag for VTR is inverted (in step 162). Then, if the viewer again operates the [PASS] key of the remote commander 7, then the cursor DP₃ of FIG. 17 is further shifted by one line below and is placed at the position of [VD], for video disc player, while the display flag for VTR is not changed (in step 163).

If in the next step 164 the viewer operates the [SET-UP] key of the remote commander 7, then the display flag for the video disc player is inverted (step 165). Further, if the viewer operates the [PASS] key of the remote commander 7, then the cursor DP₃ of FIG. 17 is further shifted by one line and is placed at the next position of [AUDIO] while the display flag for the video disc player is not changed (in step 166). Similarly, display flags for other apparatus are changed and then, the CPU 32 for channel selection is set in the standby mode for awaiting another input from the remote commander 7 (in steps 167 and 168).

According to the embodiment of FIGS. 16 and 17, there are provided the display flags for the respective apparatus connected to the television receiver via the bus lines and the conditions of these display flags are changed separately, whereby the viewer can stop at any time the display of control information for apparatus that the viewer does not want, independently.

According to the home-bus-information display system of the first embodiment of the present invention, the control status of each of a plurality of apparatus are selectively superimposed upon a video screen of a television receiver installed in a home or an office and which is most suitable as a terminal apparatus of a so-called man-machine interface, if necessary. Therefore, an extra control apparatus such as a central control panel and the like is unnecessary.

According to the home-bus-information display system of the second embodiment of the present invention, the above-noted superimposed display of the control status is not performed at all times so as to not disturb the normal broadcast viewing condition.

According to the home-bus-information display system of the third embodiment of the present invention, a status display mode is provided so that, when the viewer wants, the viewer can visually confirm the control status of each of a plurality of apparatuses.

According to the home-bus-information display system of the fourth embodiment of the present invention, since a plurality of control statuses of each of a plurality of apparatuses are sequentially displayed on different display screens, it becomes possible for the viewer to visually confirm the control status of each of all of the apparatuses without cumbersome operation.

According to the home-bus-information display system of the fifth embodiment of the present invention, the viewer can readily confirm a change of control status of an apparatus.

According to the home-bus-information display system of the sixth embodiment of the present invention, the displayed portion corresponding to a certain apparatus is blinked or displayed in a color different from those of the other displayed portions, whereby the viewer can readily identify the apparatus whose control status has changed.

According to the home-bus-information display system of the seventh embodiment of the present invention, the viewer can distinguish the kinds of control status of each of a plurality of apparatuses one from another with ease.

According to the home-bus-information display system of the eighth embodiment of the present invention, even when a plurality of apparatuses are not in fact connected to a television receiver via bus lines, the television receiver can display a simulation of the control status of each of these apparatuses in a superimposed fashion as though they were connected to the television receiver. Therefore, the television receiver can perform a demonstration operation.

Furthermore, according to the home-bus-information display system of FIGS. 16 and 17, the superimposed display of control status of each of one apparatus can be selectively stopped, whereby the display of the control status of each of the undesired apparatus can be stopped.

Having described preferred embodiments of the present invention in detail with reference to the accompanying drawings, it is to be understood that the invention is not limited to those precise embodiments and that many changes and modifications can be effected by one skilled in the art without departing from the spirit and scope of the invention as defined in the appended claims.

We claim as our invention

1. A home-bus-information display system comprising:
   (a) a video monitor having a picture screen;
   (b) a signal source for supplying a video program;
   (c) a plurality of home apparatus to be controlled electrically; and (d) electrically controlling means provided in each of the plurality of home apparatus; characterized in the combination of (e) a bus-line connected between the video monitor and each of the plurality of home apparatus;

(f) information means provided in each of the plurality of home apparatus for generating a distinctive status information signal in response to the electrically controlling means and for transmitting the status information signal to the video monitor through the bus-line; and (g) display means responsive to the video program and the status information for displaying the status information additively to the video program on the picture screen of the video monitor.

2. A home-bus-information display system according to claim 1, wherein the display means includes timer means for displaying the status information for a predetermined time period.

3. A home-bus-information display system according to claim 1, wherein the display means displays the status information on the picture screen with different colors according to the content of the status information.

4. A home-bus-information display system according to claim 1, wherein the display means includes demonstrating means for displaying simulated status information signals.

5. A home-bus-information display system according to claim 1, wherein the display means has a status-only display mode and only the status information information signals are displayed on the whole picture screen without being superimposed on the video program when this mode is selected.

6. A home-bus-information display system according to claim 1, wherein the display means includes means for displaying numerical data on the picture screen when the received status information signal cannot be recognized as corresponding to any of the home apparatus.

7. A home-bus-information display system according to claim 1, wherein the display means includes home apparatus selection means for displaying status information signals received only from selected home apparatuses without displaying the status information signals received from the unselected home apparatus.

8. A home-bus-information display system according to claim 1, wherein the display means includes an indicator for indicating whether the video monitor has received a status information signal from the home apparatus or not.

9. A home-bus-information display system according to claim 8, wherein the indicator is an LED (light emitting diode) device.

10. A home-bus-information display system as recited in claim 1, further comprising:

(h) signal supply means for supplying control signals on the bus-line to each of the controlling means to control the operations of the plurality of the home apparatus.

11. A home-bus-information display system according to claim 10, wherein the control signal includes an apparatus address code and a function code.

12. A home-bus-information display system according to claim 10, wherein the signal supply means includes a remote controller for emitting the control signals, and signal receiving means provided in the video monitor for receiving the control signals from the remote controller and supplying the same on the bus-line.

13. A home-bus-information display system according to claim 12, wherein the operations of the display means are controlled by the remote controller.

14. A home-bus-information display system according to claim 1, wherein the display means includes a mode switch for the status information and the status information is displayed when the mode switch is operated.

15. A home-bus-information display system according to claim 14, wherein the mode switch has a display function in which the status information for each apparatus is sequentially displayed by different pictures.

16. A home-bus-information display system according to claim 15, wherein the mode switch includes a home-apparatus-selection key for displaying only the status information signal of a desired home apparatus.

17. A home-bus-information display system according to claim 15, wherein the display means includes an automatic change-over means responsive to a newly generated status information signal from a certain home apparatus for displaying the status information of the certain home apparatus on the picture screen taking priority over the status information signals of other home apparatuses.

18. A home-bus-information display system according to claim 17, wherein the automatic change-over means displays the status information of the certain home apparatus differently from a status information signal display of the other apparatuses.

* * * * *